(12) United States Patent
Jensen (10) Patent No.: US 10,941,581 B2
(45) Date of Patent: Mar. 9, 2021

(54) HOT TUB COVER WITH MULTI-LAYER CORE CONSTRUCTION AND SEAMLESS EXTERIOR SHELL

(71) Applicant: Jeffrey Allen Jensen, Marysville, WA (US)

(72) Inventor: Jeffrey Allen Jensen, Marysville, WA (US)

( * ) Notice: Subject to any disclaimer, the term of this patent is extended or adjusted under 35 U.S.C. 154(b) by 95 days.

(21) Appl. No.: 16/141,961

(22) Filed: Sep. 25, 2018

(65) Prior Publication Data
US 2019/0093377 A1 Mar. 28, 2019

Related U.S. Application Data

(60) Provisional application No. 62/562,715, filed on Sep. 25, 2017.

(51) Int. Cl.
| | |
|---|---|
| *E04H 4/08* | (2006.01) |
| *E04H 4/10* | (2006.01) |
| *B32B 3/12* | (2006.01) |
| *B32B 5/18* | (2006.01) |
| *B32B 27/30* | (2006.01) |

(52) U.S. Cl.
CPC .............. *E04H 4/082* (2013.01); *E04H 4/10* (2013.01); *B32B 3/12* (2013.01); *B32B 5/18* (2013.01); *B32B 27/302* (2013.01); *B32B 2305/022* (2013.01); *B32B 2305/024* (2013.01); *B32B 2307/304* (2013.01); *B32B 2307/7246* (2013.01); *B32B 2307/7265* (2013.01); *B32B 2323/04* (2013.01); *B32B 2323/10* (2013.01); *B32B 2325/00* (2013.01)

(58) Field of Classification Search
CPC ......... E04H 4/082; E04H 4/088; E04H 4/084; E04H 4/086
USPC .............................................................. 4/498
See application file for complete search history.

(56) References Cited

U.S. PATENT DOCUMENTS

| | | | | |
|---|---|---|---|---|
| 4,857,374 A * | 8/1989 | Perry | ...................... | E04H 4/084 428/71 |
| 5,001,810 A * | 3/1991 | Baer | ...................... | E05D 3/122 16/302 |
| 5,086,525 A * | 2/1992 | Christopher | .............. | E04H 4/08 4/498 |
| 5,974,600 A * | 11/1999 | Pucci | ...................... | E04H 4/084 4/498 |
| 2007/0245479 A1* | 10/2007 | Schroeder | ................. | E04H 4/08 4/498 |
| 2008/0282461 A1* | 11/2008 | Sneed | ........................ | E04H 4/08 4/498 |
| 2009/0307834 A1* | 12/2009 | Rizzotto | ................. | E04H 4/108 4/503 |

* cited by examiner

*Primary Examiner* — Lauren A Crane (57) ABSTRACT

A hot tub cover consists of an impermeable exterior shell and at least one multilayered insulative and structural core. Each multilayered insulative and structural core may further have multiple core layers layered adjacent to each other in various configurations, providing superior protection from heat losses from within the hot tub as well as structural strength and durability.

22 Claims, 4 Drawing Sheets

HOT TUB COVER WITH MULTI-LAYER CORE CONSTRUCTION AND SEAMLESS EXTERIOR SHELL

The current application claims a priority to the U.S. Provisional Patent application Ser. No. 62/562,715 filed on Sep. 25, 2017.

FIELD OF THE INVENTION

The present invention relates generally to hot tubs. More particularly, the present invention is a cover for hot tubs with a novel multilayered core construction and a seamless exterior shell.

BACKGROUND OF THE INVENTION

A hot tub or spa is a large tub or small pool full of heated water used for hydrotherapy, relaxation or pleasure. Some have powerful jets for massage purposes. Hot tubs and spas are most commonly made of wood, fiberglass, plastic or concrete. In contrast to a typical bathtub, spas and hot tubs are built large enough to handle more than one person at a time with most models made to handle 4 or more people and the water is not drained and changed for each use. Instead the water is kept sanitary and warm via an electric pump, filter and heater assembly similar to those used for swimming pools.

To maintain a spa or hot tub properly and safely, one must keep the water clean and sanitary and at a water temperature that is comfortable for the occupants. The typical water temperature of a spa or hot tub in use is between 99 to 104 degrees Fahrenheit and controlled by a thermostat. In addition to the filter system, various chemicals are used to help insure that the water remains sanitary because the higher temperatures of the water can promote bacteria and algae growth plus increase the chances of damages to the plumbing system including the pump, heater and filter. These chemicals include chlorine and bromine to kill bacteria and algae as well as sodium bicarbonate and sodium bisulfate to control the ph levels of the water plus many more chemicals used to control stains, scale, foaming, shock treatments, odors, alkalinity and acid demands. The higher temperatures of the water, coupled with the chemicals used to keep the water sanitary and safe and increase the life expectancy of the plumbing system combine to create a harsh environment that the spa or hot tub and its supporting equipment is exposed to on a continual basis.

The majority of spas and hot tubs are installed outdoors. In addition to the demanding environment that the spa or hot tub is exposed to simply to maintain and contain the warm chemically treated water as noted in the preceding paragraph, when a spa or hot tub is installed outdoors, it is also exposed to harmful UV radiation, high heat from the sun, extreme below freezing cold in the winter, wind, rain, fog, dust and debris, leaves and falling branches, insects, rodents and other animals that may include bears, dogs, cats, racoons and more, which have been known to frequently damage hot tubs and spas and their supporting equipment.

Additionally, most modern spa and hot tub systems produced today include an ozone pump to help maintain sanitary and healthy water conditions while remaining comfortable for the users. Although the use of harsh chemicals such a chlorine, bromine, acids and alkaline can help to keep the water clean and sanitary, these same chemicals are also toxic to humans and animals and they have many bad side-effects such as bleaching the colors out many surfaces of the spa, hot tub and surrounding surfaces as well as the bathing suits worn by occupants and their towels and they can be harsh to sensitive skin on the bathers too. The odor from these chemicals can also be irritating to the sinuses of the occupants. The use of ozone reduces the need to add some of these other harsh chemicals making it more comfortable and safer for the occupants and users. Although ozone also has a pungent odor, it can be considered the lesser of two evils when choosing between chlorine or bromine, and ozone. Ozone is a very unstable gas and is among the most powerful oxidizing agents known. Ozone generators pump ozone into the water inside the spa or hot tub via the plumbing, heating and filtering system. Small bubbles of ozone are typically injected into the water stream so that the ozone can have the needed direct contact with bacteria, dirt and microorganisms to help keep the water clean and healthy. Because ozone has a very short effective shelf life, ozone generators in a spa or hot tub must continually produce ozone to replace the ozone lost. Ozone is known to have a half-life as short as a half an hour under atmospheric conditions. Many ozone generators are controlled with an automatic timer on the spa or hot tub to help keep the unstable ozone gas at the correct level to properly kill bacteria and keep the water sanitary because of this.

In order to provide the owners, operators and users of a spa or hot tub a safe, sanitary, warm and comfortable hydrotherapy, relaxation or pleasurable experience on a continual basis, spas and hot tubs should be built to withstand all of the demanding and harsh environmental conditions that it will be exposed to as noted in the previous three paragraphs. Furthermore, buyers of a spa or hot tub are making a sizable investment in cash and they want their investment to last as long as possible and provide trouble free performance even with the harsh and demanding environment as noted here.

With the harsh and demanding environment that a spa and/or hot tub is continually exposed too, adding a cover to the spa or hot tub extends life of the equipment, and reduces the amount of work needed to maintain the water to its proper chemistry for spa and hot tub owners and operators. A cover over the spa or hot tub also greatly reduces the amount of energy used and work performed to keep the water warm and clean. A cover provides insulation to keep heat in and the cold out so that the heater and pump system do not have to work as hard or as long to maintain the ideal temperature. A cover provides additional protection from the environment and from dirt and debris from entering the water reducing the amount of time that the pump and filter need to run to keep the water clean. A cover also reduces the amount of chemicals needed to maintain proper water quality by keeping the dirt and debris out, by keeping an ideal and constant temperature, by reducing evaporation and by protecting the water and spa from the environment, including harmful UV rays. A cover also helps to improve the efficiency of the ozone generator at keeping sanitary water conditions by slowing down the release of the ozone bubbles into the atmosphere. A cover over the hot tub or spa also protects children and animals from inadvertently or accidently falling in to the water, damaging the spa or hot tub, and potentially getting injured or even drowning. However, a spa or hot tub cover is subject to harsher conditions than the spa or hot tub itself because the cover is fully exposed to nature's elements while protecting the spa or hot tub from these elements. The cover is fully exposed to human and animal damages and misuse. The cover is fully exposed to the chemicals used to maintain healthy and sanitary water conditions within the spa or hot tub. Gases from these chemicals concentrate below the cover and rise and permeate the bottom of the covers degrading the materials soaking into the core of the prior art designs. Covers also need to be opened and closed for each use which exposes the cover, the cover hinges and the cover surfaces to damage each time.

Heretofore, the majority of spa and hot tub covers used have been fabricated from rigid, lightweight insulative foam which is typically wrapped with a very thin plastic sheeting and then covered with a decorative and semi-protective vinyl cover. The insulative foam used is typically an expanded polystyrene foam (EPS), aka; a well-known brand of EPS is "Styrofoam". The decorative, often times even marine grade, vinyl cover of the prior art available today is not water proof or vapor-proof. Moisture absorption into the insulative core is the number one leading cause of spa and hot tub cover failure of this prior art. In addition to water being able to soak right through the vinyl, the vinyl seams are sewn together which offers additional means for water to flow through the vinyl into the layers below of the fabricated spa and hot tub cover. To mitigate this, prior art includes a second, and sometimes a third layer of plastic sheeting wrapped around the EPS core to help keep water and vapor out. Typical fabrication of this prior art involves the use of a 3 to 6 mil thick layer of polyethylene sheeting which can be glued or heat sealed to increase its effectiveness at keeping out water and protecting the EPS core from water intrusion. This waterproof layer is critical for the long life, insulating efficiency and performance. Keeping water out of the core is also important for ease of use of the cover because if water gets into the EPS core the effects are very detrimental. A water soaked EPS core greatly reduces the insulative value of the cover which increases the amount of energy needed to keep the water warm and the cost to the owner. A water soaked EPS core creates a breeding ground for mold and bacteria to grow and thrive within the cover creating major health concerns and odor problems for hot tub and spa owners. A water soaked EPS core can greatly increase the weight of the cover making it very difficult for the spa and hot tub owner to open and close the cover. A water soaked EPS core increases the chances of the EPS core breaking due to the added weight and weaknesses. Water absorbing into the EPS core causes the metal reinforcement framing to rust, weaken and break.

Additionally, prior art spa and hot tub covers have a limited ability to support extra weight such as a person walking or standing in the center of a closed cover or the added weight of snow.

Additionally, prior art spa and hot tub covers using the vinyl wrapped foam core fabrication do not offer any form of gasketing to mitigate heat loss, minimize chemical use, and to keep bugs and dirt out of the water. Instead they employ a skirt that is made of the same vinyl that hangs down from the perimeter edge all around the lip of the spa or hot tub. This system allows steam and vapor to escape, it allows heat to escape, it allows the wind to blow under the cover blowing in dirt, dust and debris, it allows bugs to crawl in and increases the use of energy to heat the water, energy to keep the water clean, increases the use of chemicals and increases the costs to maintain the spa or hot tub.

In recent years spa owners have seen the need for improvement in the prior arts engineering, design, functionality, life expectancy, performance, manufacturing and fabrication methods. The soft vinyl shell and protective vapor barrier(s) of poly sheeting are soft and vulnerable to puncture, tears, damages and subsequent leaks allowing water to soak into the insulative core and ruin the cover. In addition to the protective vinyl and poly sheeting covers of prior art being soft and vulnerable to damages, the harsh environmental exposures of a spa or hot tub decreases the effective life of this type of cover as well. Ozone, chlorine, bromine, acid and alkaline used to treat the water drastically shortens the effective life of the vinyl and poly shells. Neither the marine grade vinyl nor the polyethylene vapor barrier used to protect the EPS core is rated for continued exposure to the chemicals used to maintain a hot tub or spa and this results in these materials cracking, splitting, seams tearing easily, degrading to the point of failure which allows the water to enter the insulative core and the eventual failure of the cover.

Additionally, the hinges used in prior art are made of the same vinyl as the cover so consequently, when the vinyl degrades, so does the strength and integrity of the hinge leading to the hinge tearing, seams pulling apart and ripping creating more problems as well as another means for water to soak into the EPS core.

Additionally, in recent years several other patents have been applied for and granted to help offer improvements over the prior art vinyl covered insulative foam core designs as discussed in the prior four paragraphs. Some of these recent prior art strategies have eliminated the need for the vinyl cover and the polyethylene vapor barrier all together which effectively removes the water intrusion issues seen with the foam core in prior art. One such embodiment uses rigid plastic, rectangular shaped tubes, filled with insulative foam while other embodiments use sheet metal shells and roto-molded shells to protect the insulative core. Other prior art patents have eliminated the use of the EPS core and replaced it with plastic bubble wrap to eliminate the issues with the water soaked EPS core. While these latest prior art embodiments do offer significant improvements over the vinyl and poly sheeting covered foam core, each still has its short comings. The latest prior art limits the insulative values available because they are limited in how thick they can make them so the energy costs to operate the spa or hot tub increase due to increased heat loss caused by the thinner cover. These prior art embodiments are also limited to the size, shapes and models of spas and hot tubs that they can fit properly, and their construction materials are heavier creating the need for specially designed lifts, hinges and openers for spa and hot tub owners to easily and comfortably open and close the covers.

Therefore, a need exists for a spa and/or hot tub cover that addresses these issues and other shortcomings associated with the prior art spa and hot tub covers which were utilized heretofore. More specifically, the need exists for a spa or hot tub cover that, remains lightweight, vapor proof and waterproof over the life of the spa or hot tub, is structurally supporting to withstand demanding use, that has improved insulative abilities that do not degrade over the life of the spa or hot tub or add to the weight of the cover and that eliminates degradation concerns from harsh environmental and chemical exposures.

BRIEF SUMMARY OF THE INVENTION

The present invention comprises a cover used on hot tubs and/or spas generally consisting of a novel seamless outer shell capable of providing strong, vapor proof and waterproof protection of the inner core. The outer shell is cut, scratch, tear, scuff and mar resistant. The outer shell is highly weather and chemical resistant. The outer shell can also be finished with multiple different finishes, layers, textures and patterns for decorative and/or protective layers.

The inner core of the present invention generally consists of a multilayered, multipurposed sandwich core capable of providing novel insulative values and novel structural support. In preferred embodiments, the sandwich core generally consists of a structural supporting and radiant heat reflective honeycomb sandwich assembly that works in tandem with other layers of insulation and/or air spaces. Together, the multiple sandwich layers that comprise the core of the hot tub or spa cover provide novel protection against convective, conductive and radiant heat-loss as well as novel structural strength and/or a decorative 3-dimensional textured or patterned surface.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising", when used herein, specify the presence of stated features, steps, operations, elements, various embodiments, and/or components, but do not preclude the presence or addition of one or more other features, steps, operations, elements, various embodiments, components, and/or groups thereof.

Unless otherwise defined, all terms (including technical and scientific terms) used herein have the same meaning as commonly understood by one having ordinary skill in the art to which this invention belongs. It will be further understood that terms, such as those used in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques, embodiments and/or steps are disclosed. Each of these has individual benefit and each can also be used in conjunction with one or more, or in some cases all, of the other disclosed techniques, embodiments and/or steps. Accordingly, for the sake of clarity, this description will refrain from repeating every possible combination of the individual steps, techniques or embodiments in an unnecessary fashion. Nevertheless, the specification and claims should be read with the understanding that such combinations are entirely within the scope of the invention and the claims.

New spa and hot tub covers, apparatuses, fabrications, methods of manufacture and assembly and various qualities are discussed herein. In the following description, for purposes of explanation, numerous specific details are set forth in order to provide a thorough understanding of the present invention. It will be evident however, to one skilled in the art, that the present invention may be practiced with or without these details.

The present disclosure is to be considered as an exemplification of the invention, and it is not intended to limit the invention to the specific embodiments illustrated by the figures or descriptions.

The present invention is a novel cover for hot tubs, utilizing one or more multilayered insulative and structural cores 2 and/or structural cores within a seamless exterior shell to provide enhanced protection against heat losses from within the hot tub as well as structural durability and decorative qualities. In general, in reference to FIG. 1, the present invention comprises an impermeable exterior shell 1 and at least one multilayered insulative and structural core 2. It may be further understood that the present invention further comprises an upper end 3 and a lower end 4, with the upper end 3 being regarded as the top of the cover visible when the cover is installed onto a hot tub and closed, with the lower end 4 being hidden from view and trapping heat and gases within the hot tub. It may be further understood that in various embodiments, the hot tub cover of the present invention may be divided into two or more sections as is typical with hot tub covers so that the cover may be folded in order to partially expose the water in the hot tub or to store the cover.

Figure 1:
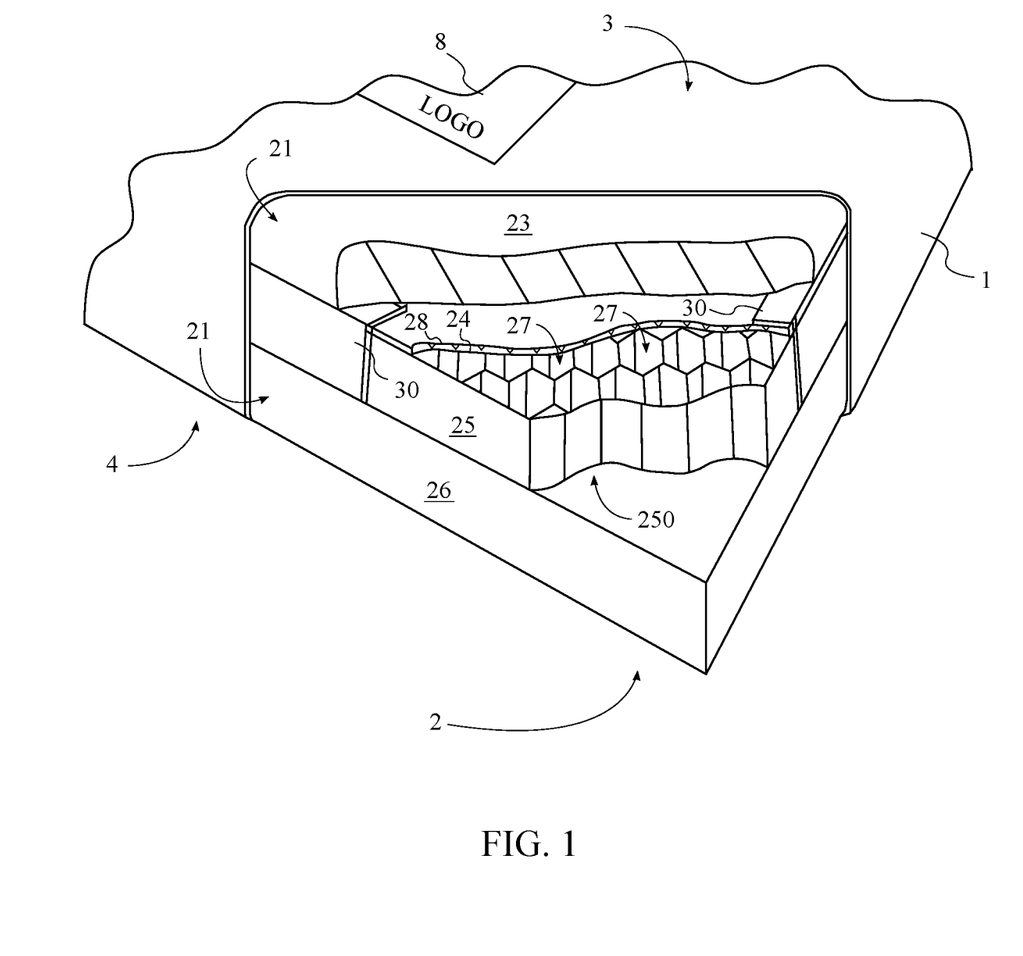
FIG. 1 is a cut-away perspective view of one embodiment of the present invention.

Each of the at least one multilayered insulative and structural core 2 is layered adjacent to each other within the impermeable exterior shell 1 between the upper end 3 and the lower end 4. In the preferred embodiment of the present invention, the impermeable exterior shell 1 is furthermore bonded to each of the at least one multilayered insulative and structural core 2, or in alternative embodiments to one or more of the at least one multilayered insulative and structural core 2. The multilayered insulative and structural cores 2 may be alternatively referred to herein as sandwich cores, or a sandwich core assembly. The impermeable exterior shell 1 is configured to be fitted atop a hot tub at the lower end 4 in order to seal the interior of the hot tub against heat losses, damage, intrusion of debris, the elements, animals, etc.

In various embodiments, each of the elements of the present invention are configured to provide structural strength, strength against environmental exposures and damages and to provide insulative protection against conductive, convective and radiant heat losses as well as a spa or hot tub cover that offers various qualities to the outside, touchable, surfaces that include, but are not limited to, surfaces with various 3-dimensional textures, patterns, designs, pictures, lettering, emblems, and/or colors, sheens and skin options and/or finishes.

In the preferred embodiment, the impermeable exterior shell 1 is vapor-proof, waterproof, scuff, cut, tear, chemical and UV resistant, and seamless. The impermeable exterior shell 1 may be manufactured of a material selected from a group comprising, but not limited to: a monomer material, a prepolymer material, a polymer material, or a plastic blend material. In the preferred embodiment, the impermeable exterior shell 1 is created by applying a coating to the multilayered insulative and structural cores 2. The coating of the impermeable exterior shell 1 is industrial by design and engineering. One version of the preferred embodiment involves a plastic coating that is used typically and primarily for a seamless coating for swimming pools, industrial storage tanks, truck bed liners, protecting industrial heavy equipment, undercoating's on cars and other vehicles, coatings for deep sea floating bouys, and as a coating for large commercial and industrial roofs. The coating can be aromatic or aliphatic in nature. It is typically a spray applied, two-part blended component. It can be a pure polyurea coating/elastomer or hybrid that is derived from the reaction product of an isocyanate component and a synthetic resin blend component. Another preferred embodiment includes the use of fiberglass and a polyurethane or epoxy resin coating for the exterior shell similar to a surfboard or boat hull coating. The plastic or fiberglass coating, whether an elastomer, a monomer, polymer, copolymer, quasi-prepolymer or other variant, is selected because of its superior strength, high UV resistance, excellent chemical resistance to all commonly used chemicals found in the care and maintenance of spas, hot tubs and swimming pools, unsurpassed vapor and waterproofing abilities, post fabrication recoat-ability and extra durable cut, tear, puncture and abrasion resistance. A preferred coating is typically spray applied over the multilayered core(s) but in some cases the sandwich core assembly may be dipped, or the seamless coating maybe applied by hand using a brush, roller, squeegee or other hand tools as well. Whether the seamless coating is spray applied, dipped or hand applied, the finished coating is seamless on all sides and edges and corners offering a 100% sealed and protected core, sealed against the harshest of environments as seen when these coatings are typically exposed to in the industry already, such as for use with the deep sea floating buoys, commercial roofs and industrial storage tanks built to hold some the most caustic of chemicals known.

Although the impermeable exterior shell 1 of the present invention, in its originally applied condition, is designed for practically any industrial exposure as noted, the impermeable exterior shell 1, being a plastic seamless coating, of the preferred embodiment can also be tinted to many different colors and, the surface of the plastic seamless coating can also be recoated with other various products offering various different appearances and features and benefits, depending on the chosen coating used to recoat the surface with. These additional and optional coatings over the impermeable exterior shell 1 included with a preferred embodiment of this invention that can be applied over the seamless plastic coating include various paint products that will offer any color of the rainbow, any sheen from a high gloss to a dull flat finish, patterns, designs and pictures painted in, and the selected paint may also include additional UV protection and/or different textures by adding a texture product to the paint such a small beads or granules to add a surface texture that is unavailable in any prior art for spa and hot tub covers. Thus, a 3-dimensional decorative embellishment 8 may be positioned on the impermeable exterior shell 1 at the upper end 3. Furthermore or alternatively, a 3-dimensional decorative embellishment may be integrated into an upper layer of one of the multilayer insulative and structural cores, resulting in the 3-dimensional embellishment appearing on the exterior of the impermeable exterior shell when the coating is applied. Furthermore, a 3-dimensional decorative embellishment may be similarly comprised along a perimeter of one or more of the multilayered insulative and structural cores. Additional coatings of the preferred embodiment may also include an additional clear UV coating. Other optional coatings in other preferred embodiments that can be applied in various ways over the seamless plastic coating included with the preferred embodiment of this invention may include; a sheet product like an outdoor wallpaper with many different colors, patterns and textures available to choose from, and/or a polyester Mylar coating, and/or a polycarbonate illusion film offering various 3-D effects or effects of motion, and/or a reflective surface with radiant heat reflective properties, and/or any other coating chosen because the base seamless plastic coating has good recoat-ability to achieve different qualities, looks, textures, finishes, added strengths, colors, sheens and appearances.

Preferably, the present invention further comprises a hinge 14 in order to divide the present invention into halves or other sectional divisions. Thus, the hinge 14 is positioned laterally adjacent to the impermeable exterior shell 1, adjacent to the upper end 3, and the hinge 14 is connected to one of the at least one multilayered insulative and structural core 2 through at least one hinge anchor 141, wherein the at least one hinge anchor 141 traverses through the impermeable exterior shell 1, and wherein the at least one hinge anchor 141 is embedded within one of the at least one multilayered insulative and structural core 2, thereby creating a structural connection between the hinge 14 and at least one of the structural insulating multilayered cores. In some embodiments, the hinge 14 may be a pinless geared hinge 14.

Preferably, the hinge 14 is a continuous geared metal or plastic hinge that connects the two sections of the cover together and allows for easy and secure opening and closing of the cover to access and use the hot tub or spa. A preferred embodiment of the new invention uses a commercial grade, heavy duty aluminum, continuous geared hinge 14 similar to a Hager Model #780-112. Prior art uses vinyl cloth, nylon and or plastic hinges which degrade over time and after exposure to UV rays and chemicals and none of these are waterproof, vapor-proof or resistant to chemicals. Although the new invention is lightweight in design and construction, the geared metal hinge 14 is a heavy-duty commercial grade unit that supports 150 pounds adding to the structural integrity of the cover assembly to support additional weight in the center of the cover when in a closed position. The pin-less geared hinge may also be made of plastic, and material notwithstanding, the design of the hinge 14 is a pin-less piano hinge 14 that includes a cap over the two geared leaves of the hinge 14. The capped pin-less hinge 14 also prevents water and debris from entering the area between the two sections of the cover with the protective metal or plastic hood that runs continuously over the hinge 14 from end to end. In a preferred embodiment of the invention, the hinge 14 is secured to the cover by screws or other mechanical fasteners attached to internal reinforcements. In addition, the hinge 14 may be caulked for additional waterproofing protection.

Each of the at least one multilayered insulative and structural core 2 comprises a plurality of core layers 21, with each of the plurality of core layers 21 being layered adjacent to each other for each multilayered insulative and structural core 2. The particular construction of each multilayered insulative and structural core 2 may vary in different embodiments. For each of the at least one multilayered insulating and/or structural core 2, each of the plurality of core layers 21 may be selected from a group comprising, but not limited to: a structural core layer, a heat reflective core layer, and an insulating core layer.

Prior art for the core design of spa covers is limited to an insulative foam core typically made of expanded polystyrene (EPS), that is reinforced with metal studs, pipes or bars and this foam core is then sealed in a polyethylene sheet to help keep water and vapor from leaking in and waterlogging the foam insulation. The insulative value of the prior arts design is limited to the R-value as governed by the thickness and density of the EPS. The given R-value of the EPS is then greatly reduced if the EPS gets wet. To get around the waterlogged EPS issues seen with prior art, more recent prior art core designs also included the use of bubble wrap as the only means of insulation however this involves the use of supportive metal frames and limits the total R-value attainable.

A preferred embodiment of the new invention disclosed herein includes a multipurpose, sandwich layered core comprised of multiple layers with each layer performing different tasks and with some layers working together with other layers to create a laminated sandwich structured composite that improves the R-value of the cover without increasing its overall thickness. This makes the cover very strong to support additional weight and keep the spa or hot tub cover lightweight and thin. These layers may also be assembled in various orders and thicknesses. In various embodiment, the structural layer may be on the bottom and in another it may be on the top, for example.

The next aspect of the present invention involves the multi-purpose, sandwich layered cores engineering, design, fabrication, effects, and uses and in some embodiments, includes a tapered layer of insulative foam, a honeycomb structural sandwich panel with reflective radiant heat barriers, additional foam insulative layers, structural edge caps over the honeycomb core and high strength, high modulus skins on the honeycomb and/or structural sandwich panel core.

Figure 2:
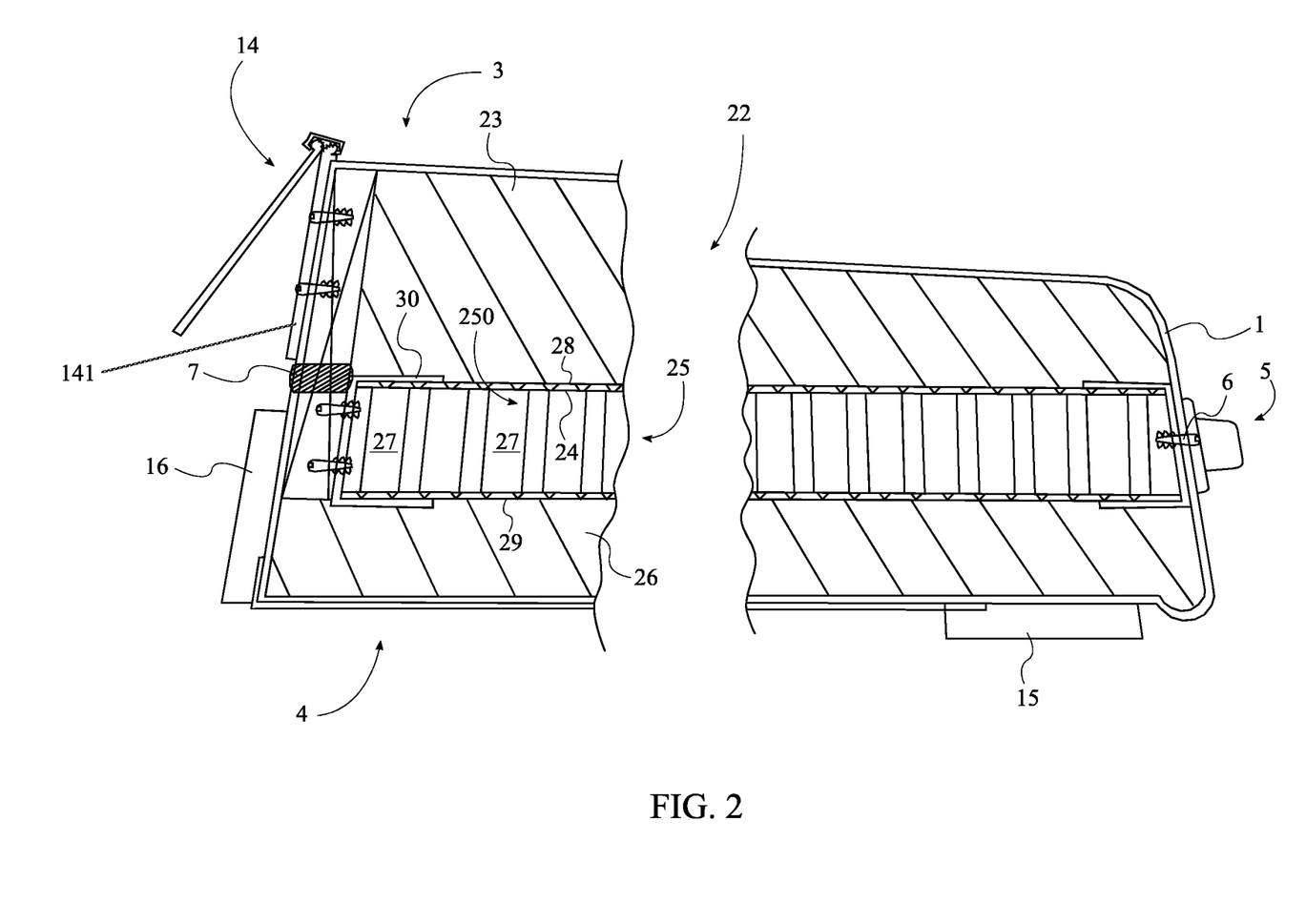
FIG. 2 is a side cross sectional view of one embodiment of the present invention.

Referring to FIGS. 1-2, in some embodiments, a specific core 22 of the at least one multilayered insulative and structural core 2 comprises a first insulating layer 23, a heat reflective surface 24, a structural sandwich panel 25, and a second insulating layer 26. The first insulating layer 23 is layered adjacent to the structural sandwich panel 25. The second insulating layer 26 is layered adjacent to the structural sandwich panel 25 opposite the first insulating layer 23. The heat reflective surface 24 is positioned between the first insulating layer 23 and the structural sandwich panel 25, and a plurality of captive air spaces 27 is distributed throughout the structural sandwich panel 25, wherein each of the plurality of captive air spaces 27 traverses through the structural sandwich panel 25 between the heat reflective surface 24 and the second insulating layer 26.

In some embodiments, the structural sandwich panel 25 comprises an internal honeycomb structural arrangement 250, with the plurality of captive air spaces 27 being distributed throughout the internal honeycomb structural arrangement 250.

Furthermore, in some embodiments, the specific core 22 further comprises a first high-strength skin 28 and a second high-strength skin 29. The first insulating layer 23 is layered adjacent to the first high-strength skin 28. The heat reflective surface 24 is layered adjacent to the first high-strength skin 28 opposite the first insulating layer 23. The structural sandwich panel 25 is layered adjacent to the heat reflective surface 24 opposite the first high-strength skin 28. The second high-strength skin 29 is layered adjacent to the structural sandwich panel 25 opposite the heat reflective surface 24, and the second insulating layer 26 is layered adjacent to the second high-strength skin 29 opposite the structural sandwich panel 25.

Furthermore, in some embodiments, the specific core 22 further comprises at least one structural end cap 30. Each of the at least one structural end cap 30 is perimetrically connected around the first high-strength skin 28, the heat reflective surface 24, the structural sandwich panel 25, and the second high-strength skin 29.

Expanding on the previous description, a preferred embodiment of the new invention disclosed herein illustrates the backbone of the cores sandwich construction, a structural honeycomb sandwich panel. The hexagonal structure of the honeycomb core uses the least material necessary to create a lattice of cells within a given volume adding strength while keeping weight down and making the cover thinner while increasing its strength. The honeycomb cells are sandwiched between two high modulus and high strength face panel skins adhesively bonded together, creating a thin panel that is cut to the dimensional size needed to fit over the top of the given hot tub or spa. The structural strength of the honeycomb panel can be compared to an I-beam for its stiffness, flexural, modulus strength and spanning capabilities but because of its inherent design that results in the most effective use of the minimum amount of materials, the results being superior strength for weight and thickness ratio. The honeycomb sandwich core is many times stronger and stiffer but weighs no more than prior art designs. Other embodiments of this inventions structural core layer use other cell shapes besides the honeycomb. Cell shapes of the structural core may also be rectangular, oval, square, round, diamond or any other shape of cell that provides the high strength laminated sandwich core laminated between the high modulus, high strength face panel skins.

The honeycomb sandwich panel fabricated for this invention and its preferred embodiment can be made from various products to achieve the ideal results of strength versus weight and thickness. Honeycomb panels are typically used in airplane manufacturing due to their high strength to weight and size ratio. They are also used in automotive, packaging, transportation and building construction for the same reasons. The products used for the honeycomb cells are typically kraft-liner, polypropylene films, aluminum films, glass fiber, nomex, polycarbonate or kevlar. The skin materials are typically aluminum, high pressure laminates, fiberglass and many different types of plastics such as polyvinyl chloride or PVC and vinyl. The materials used for the preferred embodiment of this invention are chosen based on their strength to weight ratio and cost effectiveness to achieve the design strength intended. The structural core of this invention can support many times the weight of prior art design and fabrication methods for spa and hot tub covers.

An additional function of the structural honeycomb sandwich panel is to provide the required captive air space which is necessary for improved effective insulation via radiant insulative values.

The multi-purpose sandwich core design of a preferred embodiment of the new invention provides insulation protection from all three modes of heat loss; convection, conduction and radiation, via the multilayered fabrication of the core with each layer providing different types of protection and with some layers working together to provide insulative protection. No prior art for spa or hot tub effectively covers provides heat-loss protection from all three ways, radiant, convection and conduction as explained below.

Thermal conduction is the ability of a material to conduct heat through it. Poor insulators conduct heat very easily while good insulation materials slow heat from flowing through the material. Prior art uses a single layer of expanded polystyrene foam (EPS) to insulate against conductive heat-loss and the insulative value of the EPS is determined by its thickness and density. To achieve a higher R-value, prior art required thicker covers and/or a denser EPS. The preferred embodiment of the new invention includes multiple layers of foam sandwiched with air spaces separating them. The reason for this is that high density foam and EPS are excellent insulators, not because of the foam, but because of the air trapped within its cellular construction. Trapped air is one of the best insulators. Air sandwiched between layers of foam, such as the aforementioned captive air space, increases the overall insulative R-value versus plain foam alone while reducing the weight of the cover, reducing the costs of materials necessary to build each cover and reducing the necessary overall thickness of the cover.

Radiant heat transfer is the conduction of electromagnetic waves through the air. The most common method used to prevent radiant heat-loss is the use of highly reflective surfaces such as aluminum foil and an airspace. A preferred embodiment of the new invention reduces the loss of heat through radiation with the effective use of reflective surfaces and air spaces. The reflective surface bounces the radiant heat back like a mirror. Without an airspace, radiant heat barriers do not work. A preferred embodiment of the new invention has the upper, downward facing inner surfaces of the honeycomb core layer being reflective. The best way for any heat to travel across this captive air space within the honeycomb layer is by radiation and this is protected with the reflective layers.

In addition, preferably, the bottom surface of the cover, the surface facing the water when the cover is closed, will also have a radiant heat bather applied to the seamless plastic skin such as a mirror surface Mylar as a preferred embodiment.

Convection is known as the transfer of energy between an object and its environment. In a spa or hot tub, the biggest source of convective heat loss occurs from the surface of the water to the surrounding air. The leading way that this new invention slows down this convective loss of heat is with a vapor tight seal between the cover and the perimeter walls of the spa or hot tub as well as a seal between the two folding sections along the hinge 14 creating a vapor tight seal to minimize convective heat losses. The vapor proof gasket works in tandem with the vapor proof plastic coating, making the whole cover vapor tight. Prior art with spa and hot tub covers lack the vapor proof seamless cover and/or the vapor-proof gasketing between the cover and the spa or hot tub walls leaving prior art a poor design to protect against convective heatloss.

Thus, some embodiments of the present invention may comprise one or more gaskets in order to further seal the interior of the hot tub against heat losses. As such, the present invention may comprise a vapor proof perimeter gasket 15 perimetrically connected around the impermeable exterior shell 1 at the lower end 4 as shown in FIG. 2, providing a perimeter seal around the rim of the hot tub. Furthermore, the present invention may further comprise a vapor proof seam gasket 16 that is laterally connected to the impermeable exterior shell 1 between the hinge 14 and the lower end 4, providing a seal between the halves of the cover at the hinge 14 when the cover is closed.

A preferred embodiment of the new invention includes the vapor proof gasketing. With prior art the application of a vapor proof gasket would have been a moot point because a seal is only as strong as its weakest point and with the marine grade vinyl outer layer of prior art not being water proof, the application of a vapor proof seal on the porous marine grade vinyl would not have done any good. A preferred embodiment of the new invention has a virtually vapor proof and seamless skin on all sides, top, bottom and edges. The new invention includes the addition of a vapor proof gasket to provide a vapor proof seal all around the perimeter where the cover sits on top of the perimeter walls of the spa or hot tub. In addition, there is also a vapor proof seal under the hinge along the seam between the two sections of the cover. When the cover is in the closed position, the seal prevents air and vapor from entering or leaving the space under the cover providing another means to prevent convective heat-loss.

In some embodiments, the present invention may further comprise at least one vent 7 as shown in FIG. 1, with the at least one vent 7 traversing through the impermeable exterior shell 1 adjacent to the at least one multilayered insulative and structural core 2. In some embodiments, the at least one vent 7 is a membrane vent. The at least one vent 7 may furthermore be a vent plug.

The vent plug helps vent gases and pressures from within the multilayered sandwich core and the atmosphere. A preferred embodiment of the new invention includes a vent plug, one installed in each section of the cover to equalize atmospheric and internal pressures of the cover. Temperature changes and atmospheric conditions can create internal pressures and vacuums within the cover and since the new invention is vapor proof, these pressures need a place to go. A vent plug, similar to the one designed by GoreTex membrane allows the release of internal pressures and gasses while preventing any intrusion of water. A preferred embodiment includes these plugs to be installed under the hinge 14 on each section for additional protection of the vent plug and for appearance purposes the vent will be hidden by the hinge 14. These vents are typically used in surfboards as an example. A surfboard at the beach can be sitting in the hot sun on the hot sand one minute and be plunged into the cold water of the ocean the next. This extreme and sudden change in temperature can create big internal pressure differences within the surfboard and the surrounding environment that can delaminate the outer skin of the surf board from the core structure. The membrane vent allows these pressures to escape without allowing any water to enter even when the surfboard is being used in the water. The use of a membrane vent plug is desired because the new invention has a seamless vapor proof shell coating, just as surfboards do, and is a preferred feature of the present invention.

Some embodiments of the present invention may further comprise at least one peripheral attachment 5 and at least one attachment anchor 6, as shown in FIG. 2. Each of the at least one attachment anchor 6 is embedded into one of the at least one multilayered insulative and structural core 2, wherein each of the at least one attachment anchor 6 traverses through the impermeable exterior shell 1. Each of the at least one peripheral attachment 5 is connected to one of the at least one attachment anchor 6 opposite the at least one multilayered insulative and structural core 2 across the impermeable exterior shell 1. In some embodiments, the at least one peripheral attachment 5 comprises a handle, with the handle being connected to one of the at least one multilayered insulative and structural core 2 through one of the at least one attachment anchor 6. The preferred embodiment of the present invention will have handles and tie down straps as typical spa and hot tub covers do and these accessories may be attached with screws or other mechanical fasteners held tight with reinforcing inserts as well as a tapered top for improved run-off of rain water.

Figure 3:
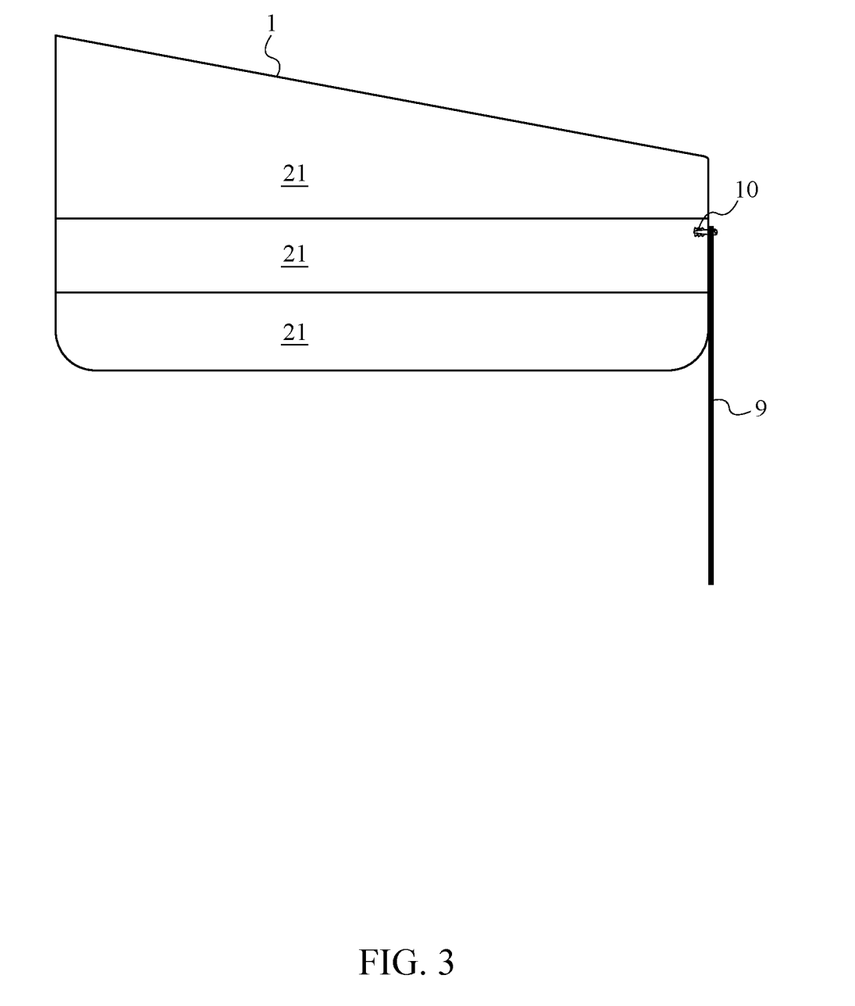
FIG. 3 is a side view of one embodiment of the present invention showing a first skirt attachment configuration.

Preferably, the present invention includes means of including a skirt 9 to hang over the sides of the brim of the hot tub while installed. Referring to FIG. 3, some embodiments of the present invention may further comprise a skirt 9 and at least one skirt anchor 10. The at least one skirt anchor 10 is embedded in one of the at least one multilayer insulating core 2, wherein the at least one skirt anchor 10 traverses through the impermeable exterior shell 1. The skirt 9 is therefore connected to the at least one skirt anchor 10 adjacent to the impermeable exterior shell 1 opposite the at least one multilayer insulating core 2 across the impermeable exterior shell 1.

Figure 4:
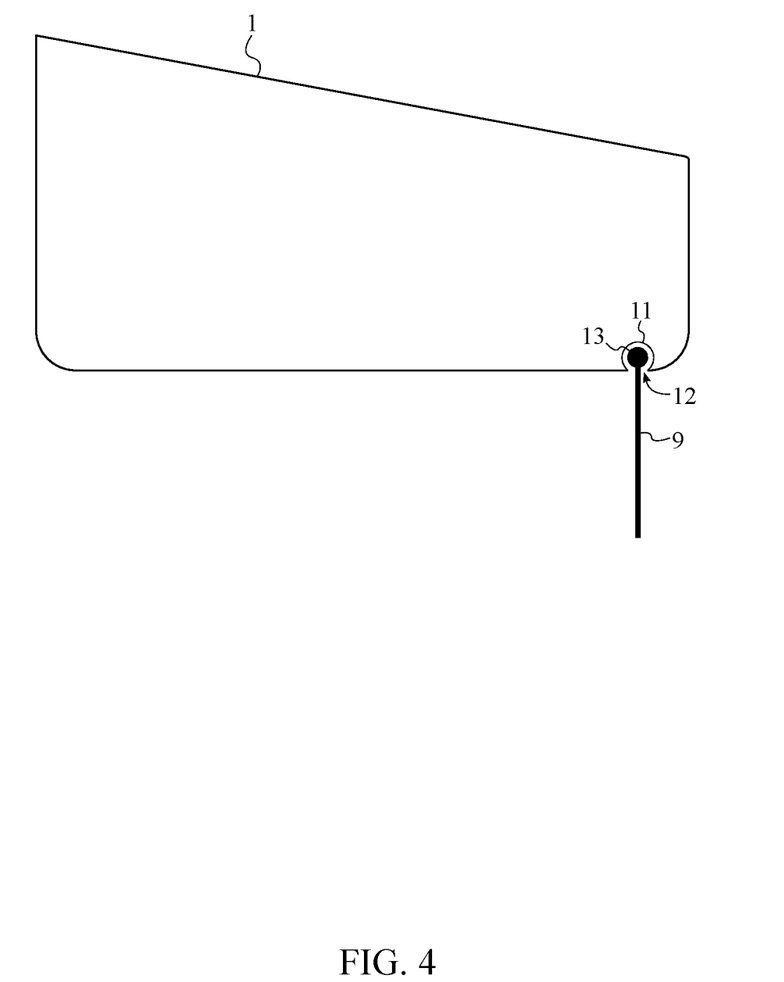
FIG. 4 is a side view of one embodiment of the present invention showing a second skirt attachment configuration.

In another embodiment shown in FIG. 4, the present invention comprises a skirt 9, a track 11, an aperture 12, and a track insert 13. The track 11 perimetrically traverses internally through one of the at least one multilayered insulative and structural core 2 adjacent to the impermeable exterior shell 1 and adjacent to the lower end 4. The aperture 12 traverses through the impermeable exterior shell 1 at the lower end 4 into the track 11. The track insert 13 is positioned within the track 11, and the skirt 9 is connected to the track insert 13, leaving the skirt 9 to traverse out from the aperture 12 and hang down below the lower end 4 of the present invention.

A preferred embodiment of the new invention includes the fabrication and design that allows extreme flexibility in shaping, dimensioning, adding edge details and surface textures and various finishes of a preferred embodied cover. A preferred embodiment includes the multilayered sandwich cores that can be cut and shaped into practically any shape desired using computer guided cutters of many types, hot wire cutters, molds, dies, or shaped by hand and custom made. The plastic seamless outer layer or coating of the new invention that is spray applied, dipped, or handmade creates many opportunities in regard to the sizes, shapes, and patterns the newly invented covers can be produced in. A preferred embodiment includes the edges of the cover to be scalloped, rounded, squared, framed, or cut to any pattern. A preferred embodiment includes the top flat surface of the cover that can also be cut into various patterns and textures. A preferred embodiment includes the top surface that can be textured such as a weaved basket pattern, and/or it can be cut to resemble waves, or wood, or leaves on a tree among many other shapes and textures. The shape and textures of the edges and surfaces of the cover as a preferred embodiment is only limited by the abilities of carving or molding the surface of the foam. A preferred embodiment includes the insertion of three-dimensional figures can be cut into or added to the top surface of the cover such as a bird, a face or someone's favorite sports team logo or type set lettering of various sizes. Once a selected design is cut into the core structure or inserted into the top layer of the multilayered core, it is simply sprayed or dipped with the plastic coating to permanently memorialize the image into the new cover. A preferred embodiment also includes the plastic coating to be recoated after these patterns or figures that have been cut and covered with the seamless plastic shell that can then be painted with additional colors and highlights to make them standout and be prominent, architectural, designer, artistic and customized. None of this has been available with prior art for spa and hot tub covers.

Although the invention has been explained in relation to its preferred embodiment, it is to be understood that many other possible modifications and variations can be made without departing from the spirit and scope of the invention as hereinafter claimed.

What is claimed is:

1. A hot tub cover with multi-layer core construction and seamless exterior shell comprises:
    an impermeable exterior shell;
    at least one multilayered insulative and structural core;
    an upper end;
    a lower end;
    each of the at least one multilayered insulative and structural core being layered adjacent to each other within the impermeable exterior shell between the upper end and the lower end;
    the impermeable exterior shell being bonded to each of the at least one multilayered insulative and structural core;
    each of the at least one multilayered insulative and structural core comprises a plurality of core layers;
    each of the plurality of core layers being layered adjacent to each other for each multilayered insulative and structural core;
    the impermeable exterior shell being configured to be fitted atop a hot tub at the lower end;
    a skirt;
    a track;
    an aperture;
    a track insert;
    the track perimetrically traversing through one of the at least one multilayered insulative and structural core adjacent to the impermeable exterior shell;
    the aperture traversing through the impermeable exterior shell into the track;
    the track insert being positioned within the track; and
    the skirt being connected to the track insert and traversing through the aperture.

2. The hot tub cover with multi-layer core construction and seamless exterior shell as claimed in claim 1 comprises:
    each of the plurality of core layers being selected from a group comprising: a structural core layer, a heat reflective core layer, an insulating core layer, and a decorative core layer.

3. The hot tub cover with multi-layer core construction and seamless exterior shell as claimed in claim 1 comprises:
    a specific core of the at least one multilayered insulative and structural core comprises a first insulating layer, a heat reflective surface, a structural sandwich panel, and a second insulating layer;
    the first insulating layer being layered adjacent to the structural sandwich panel;
    the second insulating layer being layered adjacent to the structural sandwich panel opposite the first insulating layer;
    the heat reflective surface being positioned between the first insulating layer and the structural sandwich panel; and
    a plurality of captive air spaces being distributed throughout the structural sandwich panel, wherein each of the plurality of captive air spaces traverses through the structural sandwich panel between the heat reflective surface and the second insulating layer.

4. The hot tub cover with multi-layer core construction and seamless exterior shell as claimed in claim 3 comprises:
    the structural sandwich panel comprises an internal honeycomb structural arrangement; and the plurality of captive air spaces being distributed throughout the internal honeycomb structural arrangement.

5. The hot tub cover with multi-layer core construction and seamless exterior shell as claimed in claim 3 comprises:
the specific core further comprises a first high-strength skin and a second high-strength skin;
the first insulating layer being layered adjacent to the first high-strength skin;
the heat reflective surface being layered adjacent to the first high-strength skin opposite the first insulating layer;
the structural sandwich panel being layered adjacent to the heat reflective surface opposite the first high-strength skin;
the second high-strength skin being layered adjacent to the structural sandwich panel opposite the heat reflective surface; and
the second insulating layer being layered adjacent to the second high-strength skin opposite the structural sandwich panel.

6. The hot tub cover with multi-layer core construction and seamless exterior shell as claimed in claim 5 comprises:
at least one structural end cap; and
each of the at least one structural end cap being perimetrically connected around the first high-strength skin, the heat reflective surface, the structural sandwich panel, and the second high-strength skin.

7. The hot tub cover with multi-layer core construction and seamless exterior shell as claimed in claim 1 comprises:
at least one peripheral attachment;
at least one attachment anchor;
each of the at least one attachment anchor being embedded into one of the at least one multilayered insulative and structural core, wherein each of the at least one attachment anchor traverses through the impermeable exterior shell; and
each of the at least one peripheral attachment being connected to one of the at least one attachment anchor opposite the at least one multilayered insulative and structural core across the impermeable exterior shell.

8. The hot tub cover with multi-layer core construction and seamless exterior shell as claimed in claim 7 comprises:
the at least one peripheral attachment comprises a handle; and
the handle being connected to one of the at least one multilayered insulative and structural core through one of the at least one attachment anchor.

9. The hot tub cover with multi-layer core construction and seamless exterior shell as claimed in claim 1 comprises:
at least one vent; and
the at least one vent traversing through the impermeable exterior shell adjacent to the at least one multilayered insulative and structural core.

10. The hot tub cover with multi-layer core construction and seamless exterior shell as claimed in claim 9 comprises:
the at least one vent being a membrane vent, wherein the membrane vent prevents passage of water and water vapor while equalizing pressure between the interior of the impermeable exterior shell and the surrounding atmosphere.

11. The hot tub cover with multi-layer core construction and seamless exterior shell as claimed in claim 1 comprises:
a 3-dimensional decorative embellishment being positioned on the impermeable exterior shell at the upper end.

12. The hot tub cover with multi-layer core construction and seamless exterior shell as claimed in claim 1 comprises:
a 3-dimensional decorative embellishment being integrated into an upper layer of one of the multilayered insulative and structural cores.

13. The hot tub cover with multi-layer core construction and seamless exterior shell as claimed in claim 1 comprises:
a 3-dimensional decorative embellishment being positioned adjacent to a perimeter of one of the multilayered insulative and structural cores.

14. The hot tub cover with multi-layer core construction and seamless exterior shell as claimed in claim 1 comprises:
a skirt;
at least one skirt anchor;
the at least one skirt anchor being embedded in one of the at least one multilayer insulating core, wherein the at least one skirt anchor traverses through the impermeable exterior shell; and
the skirt being connected to the at least one skirt anchor adjacent to the impermeable exterior shell opposite the at least one multilayer insulating core.

15. The hot tub cover with multi-layer core construction and seamless exterior shell as claimed in claim 1 comprises:
a hinge;
the hinge being positioned laterally adjacent to the impermeable exterior shell;
the hinge being positioned adjacent to the upper end; and
the hinge being connected to one of the at least one multilayered insulative and structural core through at least one hinge anchor, wherein the at least one hinge anchor traverses through the impermeable exterior shell, and wherein the at least one hinge anchor is embedded within one of the at least one multilayered insulative and structural core.

16. The hot tub cover with multi-layer core construction and seamless exterior shell as claimed in claim 15 comprises:
the hinge being a pinless geared hinge.

17. The hot tub cover with multi-layer core construction and seamless exterior shell as claimed in claim 1 comprises:
a vapor proof perimeter gasket; the vapor proof perimeter gasket being connected perimetrically around the impermeable exterior shell at the lower end.

18. The hot tub cover with multi-layer core construction and seamless exterior shell as claimed in claim 1 comprises:
a vapor proof seam gasket; and
the vapor proof seam gasket being laterally connected to the impermeable exterior shell between a hinge and the lower end.

19. The hot tub cover with multi-layer core construction and seamless exterior shell as claimed in claim 1 comprises:
the impermeable exterior shell being seamless.

20. The hot tub cover with multi-layer core construction and seamless exterior shell as claimed in claim 1 comprises:
the impermeable exterior shell being manufactured of a vapor proof material.

21. The hot tub cover with multi-layer core construction and seamless exterior shell as claimed in claim 1 comprises:
the impermeable exterior shell being manufactured of a water proof material.

22. The hot tub cover with multi-layer core construction and seamless exterior shell as claimed in claim 1 comprises:
the impermeable exterior shell being manufactured of material selected from a group comprising: a monomer material, a prepolymer material, a polymer material, or a plastic blend material.

* * * * *